(No Model.)
W. D. MAYFIELD.
MECHANICAL DENTISTRY.
No. 341,929. Patented May 18, 1886.
Fig. 1.
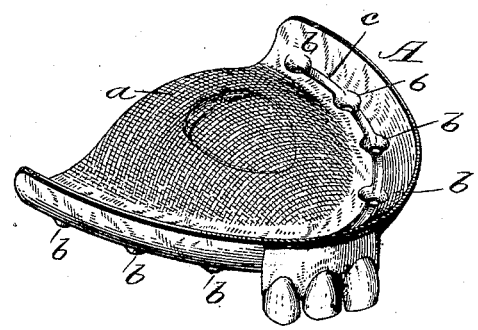
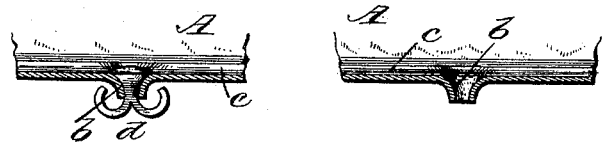
Fig. 2.   Fig. 3.
Witnesses  
Inventor  
William D. Mayfield.  
By his Attorney Chas. H. Fowler

UNITED STATES PATENT OFFICE.

WILLIAM DUDLEY MAYFIELD, OF FORT WORTH, TEX., ASSIGNOR TO WILLIAM F. MAYFIELD AND ISAAC T. MAYFIELD, BOTH OF SAME PLACE.

MECHANICAL DENTISTRY.

SPECIFICATION forming part of Letters Patent No. 341,929, dated May 18, 1886.

Application filed August 6, 1885. Serial No. 173,756. (No model.)

*To all whom it may concern:*

Be it known that I, WILLIAM DUDLEY MAYFIELD, a citizen of the United States, residing at Fort Worth, in the county of Tarrant and State of Texas, have invented certain new and useful Improvements in Dental Plates and Fastening Artificial Teeth; and I do hereby declare that the following is a full, clear, and exact description of the same, reference being had to the annexed drawings, making a part of this specification, and to the letters and figures of reference marked thereon.

Figure 1 of the drawings is a perspective view of a dental plate constructed according to my invention. Fig. 2 is a sectional detail view through one of the conical holes showing the split bolt in position as a means for fastening the teeth to the plate; and Fig. 3 a similar view with the split bolt removed.

The present invention has relation to certain new and useful improvements in the construction of dental plates and the manner of attaching the teeth thereto, substantially as shown in the drawings, and hereinafter described and claimed.

In the accompanying drawings, A represents the dental plate of any desirable material from which such plates are constructed, said plate having an indented or roughened surface, as shown at $a$, thus greatly increasing its area and making the plate hold more secure, the capillary attraction being materially increased. This surface I form by swaging it against a piece of wire webbing of suitable fineness, although any other method may be employed to obtain such surface.

The plate A, which is preferably of aluminium, is formed by punching or otherwise a series of conical-shaped holes, $b$, and a groove, $c$, extending from one hole to the other, the teeth being secured by vulcanite rubber, or other material answering the same purpose, engaging the pins in the teeth and passing through the apex of the cone-shaped holes, and spreading in the base or larger portion thereof and into the groove, or by fitting split bolts $d$, the head thereof seating itself in the base of the holes, as shown in Fig. 2, the split or hooked ends engaging the rubber.

By means of the holes and groove a permanent attachment of the teeth to the plate is secured without the necessity of using solder, thereby avoiding the danger of warping the plate by heat. When the rubber passes into and through the holes, it will spread in the groove from one hole to another, thus making a continuous strip of rubber on the upper surface of the plate which fills the groove.

Having now fully described my invention, what I claim as new, and desire to secure by Letters Patent, is—

A dental plate provided with a series of holes or perforations and a continuous groove upon the upper surface of the plate communicating with the holes or perforations therein, substantially as and for the purpose set forth.

In testimony that I claim the above I have hereunto subscribed my name in the presence of two witnesses.

WILLIAM DUDLEY MAYFIELD.

Witnesses:
 W. A. STOKES,
 J. H. SMITH.